United States Patent
Wellard et al.

(10) Patent No.: US 8,605,879 B2
(45) Date of Patent: Dec. 10, 2013

(54) METHOD, SYSTEM AND APPARATUS FOR REQUESTING CONFIRMATION OF A COMMUNICATION HANDLING RULE CHANGE

(75) Inventors: Ron Wellard, Ottawa (CA); Trung (Tim) Trinh, Nepean (CA)

(73) Assignee: Mitel Networks Corporation, Kanata, Ontario (CA)

( * ) Notice: Subject to any disclaimer, the term of this patent is extended or adjusted under 35 U.S.C. 154(b) by 1549 days.

(21) Appl. No.: 12/082,904

(22) Filed: Apr. 15, 2008

(65) Prior Publication Data

US 2009/0257576 A1    Oct. 15, 2009

(51) Int. Cl.
*H04M 3/42*    (2006.01)
(52) U.S. Cl.
USPC ............ 379/201.01; 379/201.02; 379/201.03
(58) Field of Classification Search
USPC ............... 379/201.01, 201.02, 201.03, 90.01, 379/93.01, 93.21, 157, 158, 202.01, 379/207.01; 370/259, 260, 261, 262; 455/414.1, 416
See application file for complete search history.

(56) References Cited

U.S. PATENT DOCUMENTS

| | | |
|---|---|---|
| 2002/0196919 A1 | 12/2002 | Ruckart et al. |
| 2004/0174976 A1 | 9/2004 | Elliott |
| 2005/0215243 A1 | 9/2005 | Black et al. |
| 2007/0165554 A1* | 7/2007 | Jefferson et al. ............. 370/315 |
| 2009/0094088 A1* | 4/2009 | Chen et al. ..................... 705/9 |
| 2010/0022225 A1* | 1/2010 | Benger et al. ............. 455/414.1 |

FOREIGN PATENT DOCUMENTS

EP    1662817 A1    5/2006

OTHER PUBLICATIONS

EU Search Report, Apr. 6, 2009, Wellard et al.

* cited by examiner

*Primary Examiner* — Khai N Nguyen

(57) ABSTRACT

A method, system and apparatus of requesting confirmation of a communication handling rule change is provided. A proposed change to a set of communication handling rules is determined. A time within a schedule for requesting confirmation of the proposed change is determined. The confirmation of the proposed change requested, at the time.

15 Claims, 4 Drawing Sheets

METHOD, SYSTEM AND APPARATUS FOR REQUESTING CONFIRMATION OF A COMMUNICATION HANDLING RULE CHANGE

FIELD

The specification relates generally to communication systems, and specifically to a method, system and apparatus for requesting confirmation of a communication handling rule change.

BACKGROUND

With the proliferation of intelligent call servers and policy engines that manage and direct personal or system call flows and information flows, there are also equivalent numbers of complex call handling policies and routing rules that end users need to control and configure in order to effectively manage communication and business interactions. For some users and businesses, the policies are the means to optimally minimize communications to avoid disruptions to their current work load. For others, the policies and rules are the means to enhance reachability for their activities or businesses.

The advancement and sophistication of such servers and engines, coupled with a fast paced, dynamic and constantly changing work environment, creates a problem for end users who are faced with the challenge of managing the complexity of rules and policies on a day to day basis. Complexity of rules setting, rules updating, exceptions setting and resetting are just a few examples that sometimes require the users to be experts to benefit from the value such servers and engines offer.

One approach to rule management is provided in US Patent Publication Number 2007/0165554, which discloses a call handling presence server that includes a machine learning component that derives call handling rules based on basic contact information, user call handling patterns, and presence information, and further seeks approval from the user for implementation of the rules. However, a user of the call handling presence server generally risks inundation of screen pop-ups which suggest new rules (so-called screen-pop syndrome), provides no means for implementing new rules should the user be unavailable to accept the new rules. Further the call handling presence server is limited as to how new rules are developed.

SUMMARY

A first aspect of the specification provides method of requesting confirmation of a communication handling rule change. The method comprises determining a proposed change to a set of communication handling rules. The method further comprises determining a time within a schedule for requesting confirmation of the proposed change. The method further comprises requesting the confirmation of the proposed change, at the time.

The set of communication handling rules may comprise at least one communication handling rule.

The method may further comprise determining at least one of a location and a communication device for requesting the confirmation, and requesting the confirmation of the proposed change, at the time, may further comprise requesting the confirmation at, at least one of the location and the communication device.

The time within a schedule for requesting confirmation of the proposed change may comprise a time at which a user associated with the set of communication handling rules is available to respond to confirmation requests.

Determining a time within a schedule may comprise processing at least one of the schedule and a record of at least one previously determined time for requesting confirmation of a previous proposed change to the set of communication handling rules.

Determining a time within a schedule may comprise processing at least one of the schedule and data from at least one of an organizational database, at least one presence engine, a collaboration system, a business rules database and a business process database.

The method may further comprise: determining that there is no suitable time within a schedule for requesting confirmation of the proposed change; and, in response: determining a delegate for requesting the confirmation of the proposed change; determining a time within a delegate schedule for requesting confirmation of the proposed change; and requesting the confirmation of the proposed change from the delegate, at the time within the delegate schedule. Determining that there is no suitable time within a schedule for requesting confirmation of the proposed change may comprise: determining a delay for requesting the confirmation based on a current time and the time within a schedule; and determining that the delay is greater than a threshold delay. Determining a time within a delegate schedule for requesting confirmation of the proposed change may comprise processing at least one of the delegate schedule and a record of at least one previously determined time for requesting confirmation, from the delegate, of a previous proposed change to the set of communication handling rules.

A second aspect of the specification provides a system for requesting confirmation of a communication handling rule change. The system comprises a computing device. The computing device comprises: a communication interface for communication over a communication network; and a processor. The processor is enabled for: determining a proposed change to a set of communication handling rules; determining a time within a schedule for requesting confirmation of the proposed change; and requesting the confirmation of the proposed change, at the time. The system further comprises a database for storing the set of communication handling rules, the computing device having access to the database. The system further comprises at least one information feed in communication with the computing device, for providing information to the communication device to assist in determining a proposed change to a set of communication handling rules and determining a time within a schedule for requesting confirmation of the proposed change. The system further comprises at least one client device in communication with the computing device for receiving a confirmation request generated in association with the requesting the confirmation of the proposed change, at the time, and responding to the confirmation request.

The processor may be further enabled for: determining that there is no suitable time within a schedule for requesting confirmation of the proposed change; and, in response: determining a delegate for requesting the confirmation of the proposed change; determining a time within a delegate schedule for requesting confirmation of the proposed change; and requesting the confirmation of the proposed change from the delegate, at the time within the delegate schedule. The system further comprises at least one delegate device associated with the delegate, in communication with the computing device, for receiving a delegate confirmation request generated in association with requesting the confirmation of the proposed change from the delegate, at the time within the delegate schedule, and responding to the delegate confirmation request.

The computing device may further comprise at least one analyzer module for analyzing information from the at least one information feed. The at least one analyzer module may comprise at least one of: a call log message analyzer enabled for analysis of telephony activities of a user associated with at least one of the client device and a delegate device; a messaging analyzer enabled to analyze messaging activities of the user, the messaging activities associated with at least one of voice mail, faxes, emails, and chat sessions; a collaboration analyzer enabled to analyze collaboration activities of the user, the collaboration activities associated with at least one of tasks, conferencing, and contacts; a presence analyzer enabled to analyze presence data associated with the user the presence data associated with at least one of current calendar activities, future calendar activities, keyboard activity, user proximity detection, and presence engine information. The computing device may further comprise an information discovery module enabled to receive data from the at least one analyzer module and to determine a pattern based on the data. The computing device may further comprise a rules formulation and confirmation module enabled to: receive patterns from the information discovery module; to use predefined algorithms to determine a best fit for a particular pattern to arrive at the proposed change to a set of communication handling rules; and store the proposed change in the database. The computing device may have access to a historical repository of data previously received from the at least one analyzer module, and the information discovery module may be further enabled to add the data to the historical repository if the data is insufficient to establish a pattern. The information discovery module may be further enabled to determine the pattern based on the data stored in the historical repository.

Determining a time within a schedule for requesting confirmation of the proposed change may be based on the pattern.

A third aspect of the specification provides a computing device for requesting confirmation of a communication handling rule change. The computing device comprises a processor enabled for: determining a proposed change to a set of communication handling rules; determining a time within a schedule for requesting confirmation of the proposed change; and requesting the confirmation of the proposed change, at the time.

BRIEF DESCRIPTIONS OF THE DRAWINGS

Embodiments are described with reference to the following figures, in which.

DETAILED DESCRIPTION OF THE EMBODIMENTS

Figure 1:
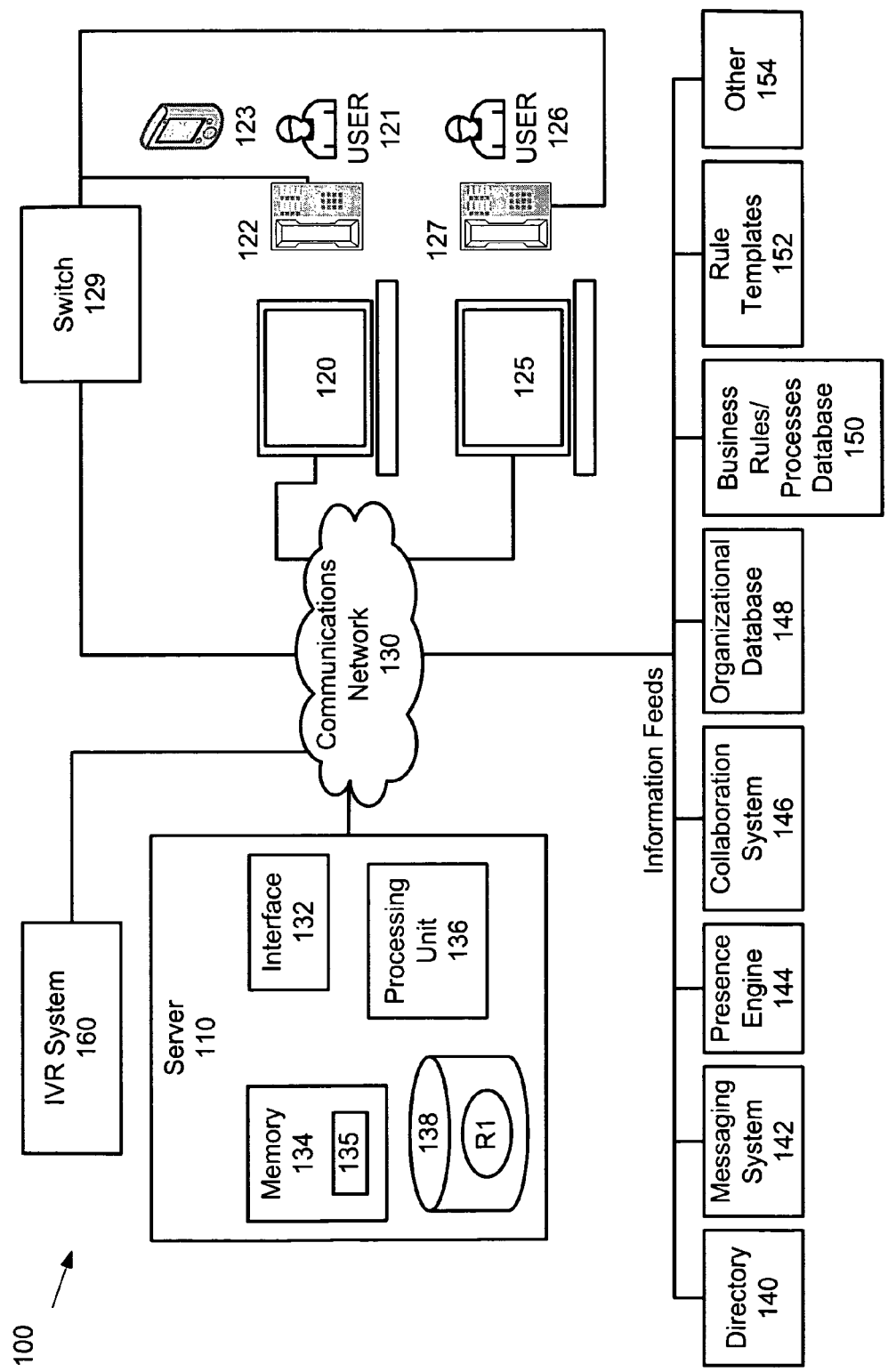
FIG. 1 depicts a system for requesting confirmation of a communication handling rule change, according to a non-limiting embodiment.

FIG. 1 depicts a system 100 for requesting confirmation of a communication handling rule change, according to a non-limiting embodiment. The system 100 is enabled according to a client server model, and hence comprises a server 110 and at least one client device 120, the at least one client device 120 associated with a user 121. In some embodiments, the at least one client device 120 may be further associated with a communications device 122. In some embodiments, the system further comprises a delegate device 125, associated with a user 126, which is also a client of the server 110, similar to the client device 120, and which may be designated as a delegate of the client device 120, as described below. In some embodiments, the delegate device 125 may be further associated with a communications device 127. In general, the server 110 communicates with the client devices (i.e. the at least one client device 120 and the delegate device 125) via a communications network 130. Further, the communications devices 122 and 127 are in communication with a switch 129 enabled for conveying data to at least one of the communications devices 122 and 127, described in further detail below.

In some embodiments, the system 100 further comprises a mobile communication device 123 associated with the user 121, including but not limited to a cell-phone, a PDA, a laptop computer enabled for mobile communications, and the like. In some these embodiments, the switch 129 is further enabled for conveying data to the mobile communication device 123. In other embodiments, the system 100 further comprises mobile switch (not depicted) dedicated to conveying data to mobile communications device such as the mobile communications device 123. In some embodiments, the mobile communications device 123 comprises a Global Positioning System (GPS) device, such that the position of the mobile communications device 123 may be determined.

Further, in some embodiments, the communications network 130 may comprise the switch 129, while in other embodiments, the switch 129 may be a standalone device, for example a switch that is dedicated to a given business or organization with which the user 121 is associated. For example, the switch 129 may comprise a telephony switch such as a MITEL 3300 IP Communication Platform (ICP) from Mitel Networks Corporation, 350 Legget Drive, Kanata, Ontario, Canada K2K 2W7, however other telephony switches are within the scope of present embodiments. In any event, the switch 129 is enabled to convey data, and specifically voice data, to at least one of the communication device 122, and the communication device 127 (and in some embodiments the mobile communication device 123, if present). In particular, the switch 129 is enabled to provide connection and call state data to the server 110 for monitoring purposes.

In some embodiments, the communication devices 122 and 127 may be in communication with different switches, similar to switch 129. For example, the communication device 122 may be located in a first geographic area serviced by the switch 129, and the second communication device 127 may be located in a second geographic area serviced by a different switch similar to switch 129.

The server 110 generally comprises a computing device for processing data and communicating via the communications network 130. Hence the server 110 comprises an interface 132 enabled to convey communications between the server 110 and the communications network 130, a memory 134 for storing at least one application 135 for requesting confirmation of a communication handling rule change and a processing unit 136 for processing the at least one application 135. In some embodiments, the server 110 further comprises a rules database 138 for storing a set of communication handling rules R1 associated with the user 121, described below. In other embodiments, the rules database 138 is a standalone component of the system 100, the server 110 in communication with the rules database 138 via the communications network 130. In a non-limiting embodiment, the server 110 may comprise a Mitel Application Suite server from Mitel Networks Corporation, however other servers are within the scope of present embodiments.

The server 110 is in further communication with various information feeds 140-154, described below, via the communications network 130, for receiving information associated with the user 121 and/or the user 126. Each of the information feeds 140-154 comprise a computing device and/or an application and/or a database for storing and/or processing information associated with the user 121, including but not limited to availability of the user 121, relationships between the user 121 and other members of an organization (such as a business), business rules and processes associated with the organization, and the like. In general, the server 110 is enabled to receive data from the information feeds 140-154 and/or the client device 120 and/or the delegate device 125, and formulate changes to the set of communication handling rules, R1, including both new communication handling rules and changes to existing communication handling rules as the communication handling rules evolve over time, and further requests confirmation of changes to the set of communication handling rules, as will be described below.

Attention is now directed to the information feeds 140-154. In addition to the functionality described below, each information feed 140-154 is enabled to provide information to the server 110, either proactively (e.g. whenever information associated with the user 121 changes or is detected) or upon request from the server 110.

A directory 140 comprises a directory of users associated with the user 121 and/or the user 126. For example, the directory 140 may comprise a directory of users associated with a business and/or organization to which user 121 and/or user 126 belongs, or is associated with. Hence the directory 140 may generally comprise a database of contact information of users associated with the user 121 and/or the user 126, including but not limited to telephone numbers, fax numbers, e-mail addresses, business addresses, home addresses, and/or network (e.g. IP) addresses of devices associated with the user 121 and/or the user 126 etc. In particular, the directory 140 is enabled to provide changes or updates in directory information to the server 110.

A messaging system 142 comprises any desired combination of suitable messaging servers including but not limited to email servers, voice mail servers, Unified Communication Servers, Office Communications Servers, fax servers, etc., as known to one of skill in the art. In general each messaging server in the messaging system 142 is enabled to process data associated with messages to and from the user 121 and/or the user 126. Each messaging server in the messaging system 142, as appropriate, may be further enabled for communication with the client device 120, the delegate device 125, the communications device 122, the mobile communications device 123, and/or the communications device 127, such that messages may be conveyed to and received from the user 121 and/or the user 126. In particular, the messaging system 142 is enabled to provide data associated with messages to and from the user 121, and/or the user 126, to the server 110. For example, the messaging system 142 may provide the server 110 with a history of messages to and from the user 121, and/or the user 126, including but limited to which users are contacted most frequently, which users' messages are most often deleted, etc.

A presence engine 144 is enabled to monitor presence of the user 121 and/or the user 126, as known to a one of skill in the art. Hence, the presence engine 144 generally comprises a computing device in communication with the client device 120 and/or the delegate device 125, and/or other presence related apparatus, to determine presence of the user 121 and/or the user 126. For example, the presence engine 144 may comprise a web presence engine enabled to monitor the presence of the user 121 and/or the user 126 within a web browser, instant messaging application etc. In particular, the presence engine 144 is enabled to provide presence data associated the user 121, and/or the user 126, to the server 110. In some embodiments, the presence engine 144 is in communication with the mobile communications device 123, such that the presence engine 123 may determine the position of the user 121 by querying the GPS device within the mobile communications device 123.

A collaboration system 146 comprises a computing device enabled for assisting the user 121, and/or the user 126, with tasks, conferencing, and contact management, as known to one of skill in the art. Hence the collaboration system 146 is generally in communication with client device 120, the delegate device 125, the communications device 122, the mobile communications device 123, and/or the communications device 127. For example, the collaboration system 146 may generally comprise an application for management of tasks, conferencing, and contacts, such as a calendaring application, and may further comprise a project collaboration application for assisting the user 121, and/or the user 126, with project management and project collaboration. In particular, the collaboration system 146 is enabled to provide collaboration data associated the user 121, and/or the user 126, to the server 110. For example, the collaboration system 146 may provide the server 110 with a list of contacts with which the user 121, and/or the user 126, is regularly in contact, as well as a list of contacts associated with a project of which the user 121, and/or the user 126, is a participant.

An organizational database 148 generally comprises a database for storing the structure of an organization, for example an organizational chart. The organizational database 148 may be distinct from the directory 140, or combined with the directory 140. In general, the structure of an organization comprises the organizational relationship between users within the business or organization to which user 121 and/or user 126 belongs, or is associated with. In particular, the organizational database 148 is enabled to provide the server 110 with the relationship between the user 121 and other users within the business or organization. For example, in some embodiments, as described below, a suitable delegate for the user 121 may not be stored at the server 110. In these embodiments, the server 110 may query the organizational database 148 as to a suitable delegate for confirming communication handling rule changes associate with the user 121, and the organizational database 148 may return an identifier of a suitable delegate, such as an administrative assistant, a subordinate to the user 121, or a designated delegate stored with the organizational database 148 (e.g. an employee reporting to the user 121, a project collaborator and the like). In these embodiments, the user 126 may be designated as the delegate, and an identifier of the user 126 and/or the delegate device 125, may be provided to the server 110. Alternatively, the delegate device 125 may itself be designated as the suitable delegate.

A business rules and processes database 150 generally comprises a database for storing the business rules and processes of business or organization associated with the user 121 and/or the user 126. In particular, the business rules and processes database 150 is enabled to provide the server 110 with business rules and processes associated with the user 121 and/or the user 126, including but not limited to business policies (e.g. spending policies, approval matrices), constraints (e.g. regulatory requirements), lists of preferred customers, etc., as well as policies surrounding sharing of information (e.g. which users in an organization have access to certain classes of information; such policies may be influenced by regulatory agencies) and accessibility. A non-limiting example of a business rule comprises an updated list of preferred contracting vendors.

A rules template server 152 generally comprises a database for storing rules templates, for example templates on how rules are to be formatted such that the rules may be processed by the processing unit 136, the switch 129, the messaging system 142, etc. In some embodiments, the rules templates may also be stored at the database 138, and the rules template server 152 is further enabled to provide the server 110 with changes to rules templates, for example if changes to switching applications and/or routing applications are implemented within the system 100 which require changes to one or more rules templates.

Other information feeds 154 may occur to one of skill in the art and are within the scope of present embodiments. Non-limiting examples of other information feeds 154 comprise an SAP database, warehousing and inventory databases, an identify server, etc.

The communications network 130 comprises any suitable communications network for conveying data between the server 110 and the client device 120 and/or the delegate device 125, the information feeds 140 to 154 and server 110, and the switch 129. Further, the communications network 130 may be wired, wireless or combination as desired. For example, the communications network 130 may comprise a LAN, a WAN, the PSTN, a packet based network, a cellphone network or a combination.

In some embodiments, the system 100 further comprises an IVR (Integrated Voice Response) system 160 enabled to record voicemail for later playback to the user 121, as known to a person of skill in the art. The IVR system 160 may or may not be distinct from the messaging system 142 described above. In general, the user 121 may communicate with the IVR system via the communication device 122 (and/or the mobile communication device 123) to listen to voicemail, and record and choose appropriate voicemail greetings. In these embodiments, the server 110 may be in further communication with the IVR system 160 via the communication network 130.

Figure 2:
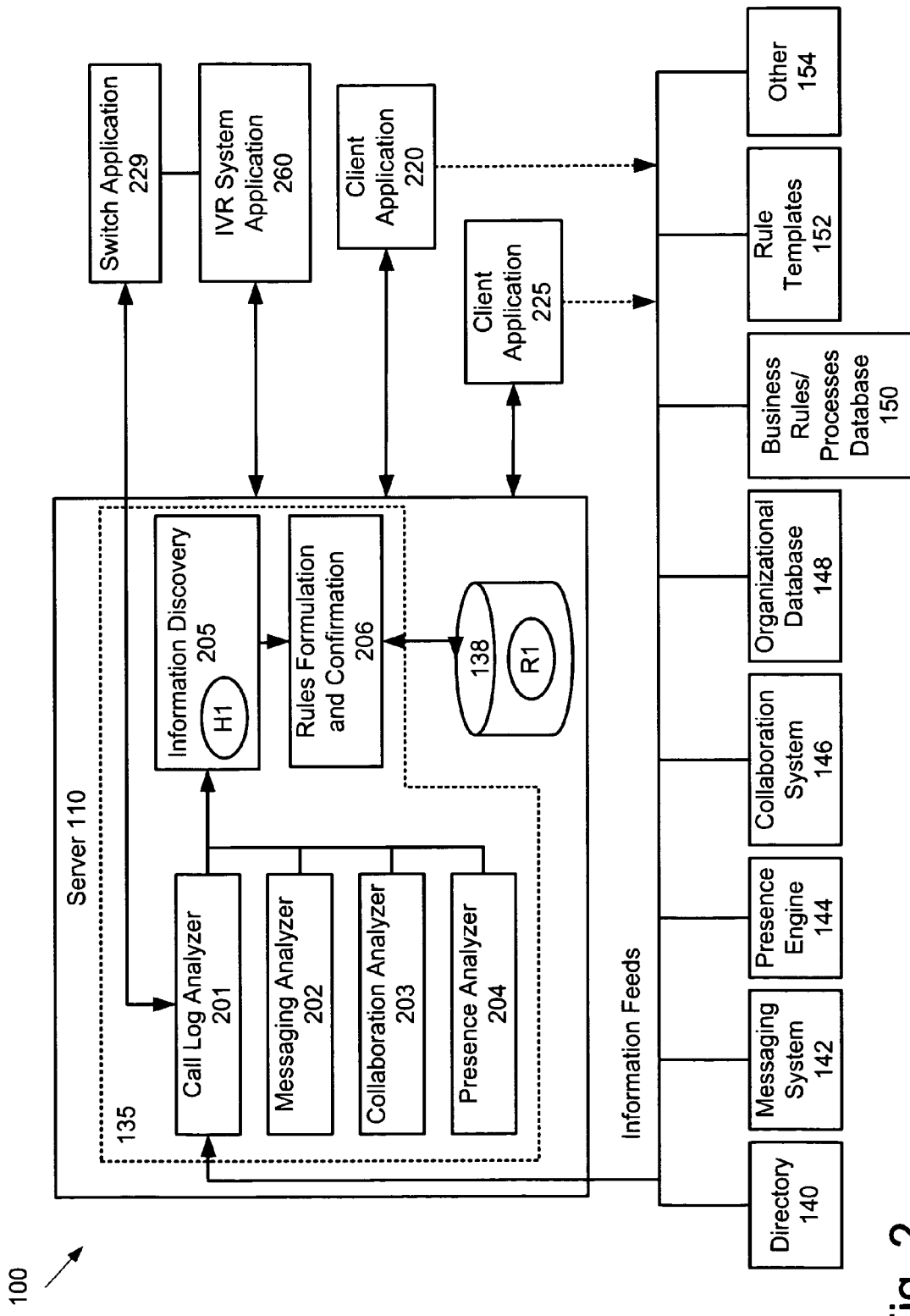
FIG. 2 depicts the software architecture of a system for requesting confirmation of a communication handling rule change, according to a non-limiting embodiment.

Attention is now directed to FIG. 2 which depicts the software architecture of the system 100, with like elements depicted with like numbers. While the communication network 130 is not depicted in FIG. 2, a person of skill in the art would understand that communications between elements occur via communication network 130, or any other suitable communication network, as desired.

A client application 220 resides at the client device 120 for monitoring activity of the user 121 at the client device 120 (e.g. when the client application 220 is processed by the client device 120), including but not limited to documentations, keyboard activity, chat info, presence status, etc. The client application 220 is further enabled to provide data associated with monitored activity to the server 110 for analysis, as described below. The client application 220 is further enabled to interact with the user 121 when confirmation of a newly formulated or revised communication handling rule is required from the user 121. In some embodiments, the client application 220 is further enabled to allow the user 121 to configure preferences or overwrites (exceptions).

The client application 225 resides at the delegate device 125 and is similar to the client application 220, however the client application 225 monitors activity of the user 126 at the delegate device 125.

The switch application 229 generally resides at the switch 129 and enables the switch 229 to provide connection and call state data to the server 110 for monitoring purposes. In some of these embodiments, the switch application 229 enables the switch 229 to access the database 138 to retrieve communication handling rules from the set of communication handling rules R1 which pertain to the switch 129, and apply these communication handling rules as part of call routing for the user 121.

Some embodiments that comprise the IVR system 160, further comprise an IVR system application 260 which generally resides at the IVR system 160. In some of these embodiments, the IVR system application 260 enables the IVR system 160 to access the database 138 to retrieve communication handling rules from the set of communication handling rules R1 which pertain to the IVR system 160, and apply these communication handling rules as part of call routing for the user 121.

The at least one application 135 stored at the server 110 comprises various analyzer modules 201-204, an information discovery module 205, and a rules formulation and formation module 206. In general, the analyzer modules 201-204 enable the server 110 to analyze data from the information feeds 140-154 to proactively monitor and adaptively analyze current and future events (e.g. scheduled events) associated with the user 121 and/or the user 126. Further, the analyzer modules 201-204 enable the server 110 to couple data received from the information feeds 140-154 with historical information, for example a historical repository H1, stored at the information discovery module 205 (and/or the database 138), to formulate or revise communication handling rules associated with the user 121 and/or the user 126, using given algorithms.

In some embodiments, newly formulated or revised communication handling rules may not come into effect until confirmed by the user 121 and/or the user 126. For example, with a completion of a call conversation or messaging interaction (e.g. via the client device 120, the communications device 122 and/or the mobile communications device 123 and in some embodiments via the switch 129 and/or the messaging system 142), the application 135 analyses data associated with the call conversation or the messaging as part of an information discovery process (performed via the information discovery module 205, for example) using historical, current and future information together with a given set of algorithms to possibly formulate new or revise existing communication handling rules, and stores the new or revised communication handling rule within the set of communication handling rules R1 stored at the database 138.

In some embodiments, the user 121 may allow the system 100 to bypass the confirmation step in the event that a newly formulated or revised communication handling rule is similar to a previous communication handling rule. In some of these embodiments, the user 121 can overwrite a communication handling rules (i.e. set an exception); however, the system 100 may monitor these exceptions to ensure that the user 121 does not forget to reset exceptions, for example when the conditions for the exception have expired.

The various analyzer modules 201-204, are now described and include a call log analyzer 201, a messaging analyzer 202, a collaboration analyzer 203, and a presence analyzer 204. Each of the analyzer modules 201-204 are enabled to receive information from the information feeds 140-154, and/or the client applications 220 and 225, the switch application 229 and/or the IVR system application 260, analyze the data and provide analysis data to the information discovery module 205.

The call log analyzer 201 is enabled for analysis of telephony activities of the user 121 and/or the user 126 (such as events and requests) including but not limited to:

monitoring incoming calls (including but not limited to calls internal to a business or organization with which the user 121 is associated, and external calls, length of a conversation, call pattern and/or cadence of speech (e.g. via a mood analyzer, not depicted))

monitoring outgoing calls (success and failed attempts, length of conversation, internal and external calls)

monitoring missed calls (internal and external calls, pattern & cadence)

monitoring call disposition behaviour (forwarding, DND (do not disturb) behaviour, VM (voice mail) deflection).

Once a transaction or interaction is completed, the call log analyzer 201 provides the analyzed data to the information discovery module 205.

The messaging analyzer 202 is enabled to analyze activities of the user 121 associated with voice mail, faxes, emails, chat sessions etc. The messaging analyzer 202 received information from the messaging servers of the messaging system 142 (e.g. on a per transaction basis) and filters the appropriate information prior to providing the filtered information to the historical repository H1.

The collaboration analyzer 203 is enabled to analyze activities of the user 121 associated with tasks, conferencing, and contacts. Once a transaction or interaction is completed, the analyzed data is passed to the information discovery module 205.

The presence analyzer 204 is enabled to analyze presence data associated with the user 121, including but not limited to current and future calendar activities, keyboard activity, user proximity detection and information from the presence engine 144. Once a transaction or interaction is completed, the analyzed data is sent over to the information discovery module 205.

The information discovery module is enabled to receive data from the various analyzer modules 201-204 and determines whether to add the data to the historical repository H1 for future reference (for example, when the data is insufficient to establish a trend or pattern) or to establish a pattern or behaviour (repeated caller, cadence of calls, etc.) then provide the pattern or behaviour to the rule formulation & confirmation module 206. Data stored at the historical repository H1 may be in any suitable format. Further, patterns may be determined to be established patterns once a given subset of data stored at the historical repository reaches a threshold value. For example, if the user 121 responds to a given caller in the same manner a threshold number of times (e.g. three times), the pattern may be determined to be an established pattern, and the subset of data may be passed to the rule formulation and confirmation module 206 so that a communication handling rule may be formulated (e.g. always respond to the given caller in accordance with the established pattern).

The rule formulation and confirmation module 206 uses predefined algorithms to determine a best fit for a particular pattern or behaviour to arrive at a new or revised communication handling rule. In some embodiments, the rule formulation and confirmation module 206 is further enabled to confirm the new or revised communication handling rule with the user 121 and/or the user 126. In some of these embodiments, the rule formulation and confirmation module 206 is further enabled to extract information from the historical repository H1 to establish the user's behaviour in determining the best time to interrupt the user 121 and/or the user 126 for confirmation of communication handling rules.

In accordance with the predefined algorithms for determining a best fit for a particular pattern or behaviour to arrive at a new or revised communication handling rule, present embodiments also provide for the use of at least one white list and at least one black list. A white list generally comprises a list of identifiers of users and/or communication devices to which the communication handling rules are specifically applied, and/or a list of identifiers of users and/or communication devices approved by the user 121. A black list generally comprises a list of identifiers of users and/or communication devices to which the communication handling rules are specifically excluded, and/or a list of identifiers of users and/or communication devices disapproved by the user 121. White lists and black lists are known to persons of skill in the art as common routing control tools. For example, calls can be screened based on the calling line ID against the pre-established lists. Emails or voicemails can be screened via sender ID. However, in the prior art, end users need to watch for and update the lists because the lists (list member addition or removal, members change from one list to another, etc.) may change over time.

Further, with the advent of presence technology, in the prior art users may also rely on presence information to establish routing communication handling rules and methods of communications. However, if not everyone adheres to the presence settings or the presence policies are not strictly enforced then the communication handling rules may become ineffective or useless.

Hence, the following non-limiting examples of pre-defined algorithms are provided the rule formulation and confirmation module 206 may apply as part of learning and detecting the patterns and trends to formulate new or revise existing communication handling rules:

1) If successive and repeated calls are received by the user 121 from a caller to who belongs to a black list, coupled with outstanding but recent emails/voicemails, then the calls from the caller may be flagged as urgent. Calls from the caller may be routed in a manner commensurate with this urgency (for example forwarded to the mobile communications device 123 and/or the communications device 127 if a call to the communications device 122 is unanswered), or alternatively, the user 121 may be notified to treat calls from this caller as urgent. Consequently, a communication handling rule that results from this algorithm may be transmitted to the switch 129 to be applied by the switch application 229.

2) If the user 121 is in the office, not in a meeting, and working at the client device 120, then call twining is disabled. Mobile twining is enabled in embodiments that include the mobile communications device 123 (and in some embodiments if a mobility option is enabled in the system 100) and away from the office or in a meeting. In embodiments where confirmation is requested, the user 121 may only confirm a communication handling rule resulting from this algorithm, the communication handling rule being automatically applied to avoid interrupting the user 121 every time.

3) If a task associated with the user 121 has a certain item to follow up with a certain other user who happens to call the user 121 then mark the call as important/urgent.

4) Automatically apply call screening to all callers in a black list and not to offer calendar or presence information to these callers. If repeated exceptions occur for a certain caller (e.g. the user 121 has used the client application 220 to except a communication handling rule when applied to the certain caller), then the user 121 may be queried (e.g. via the client application 220) if the certain caller should be moved to a white list.

5) If a call is answered regardless of working condition or situation, then the system 100 may suggest to the user 121 (e.g. via the client application 220) that the caller be placed on an overwrite (i.e. an exception) list.

6) If the user 121 does not repeatedly answer a call from a given caller while the user 121 is actually available, then the system 100 may suggest to the user 121 (e.g. via the client application 220) that the given caller be placed on a black list. For example, "repeatedly" may be defined as the user 121 not answering a call from a given caller a threshold number of times (while the user 121 is actually available).

7) Repeated missed call occurrences from the same caller while the presence status of the user 121 is generally understood to be "available", then the presence status of the user 121 may be projected to that caller differently and/or the caller may be moved onto a black list.

8) Based on the history of the duration of calls to and from a particular caller, a dynamic communication handling rule may be formulated. For example, a caller calls the user 121 often and each call takes about 20 minutes. If the caller then presently calls the user 121, and the user 121 is presently free but will be joining a meeting in 10 minutes, the communication handling rule cause a greeting to be played to the caller (e.g. via the IVR system 160) that the user 121 will be available after the meeting and/or when the user 121 has 20 free minutes. The user 121 may also be notified of the greeting played to the caller, and/or the future call may be scheduled by transmitting a message to the collaboration system, or any suitable calendaring application.

9) If call forwarding has been enabled for a period of time and the user 121 now becomes presently active (e.g. making calls and working on the client device 120) then the system 100 may ask if the user 121 (e.g. via the client application 220) if they wish to disable call forwarding. A similar scenario may be applied for a vacation greeting.

10) The user 121 may be notified of new email only if the email comes from someone who is on an overwrite (exception) list.

11) If a return call is made from the user 121 to a caller who on a black list, an offer may be presented to the user 121 to move this caller to a white list.

12) Communication handling rules may also be formulated with time limits (e.g. temporary exceptions which expire if not reinforced by the ongoing behaviour of the user 121). For example, if a call from a given caller is initially answered by a person who is a subordinate to the user 121, and the user 121 is interrupted to take to the call, a temporary exception could be offered to allow calls from the given caller to be forwarded to the user 121 for a given period of time.

13) Communication handling rule may also be formulated based on topics, such as the content of an e-mail. For example, a communication handling rule may be formulated which causes e-mails, or alerts associated with an e-mail, to be handled differently for different types of content: personal content, content associated with the business or organization of which the user 121 is a member, and content associated with a project in which the user 121 is involved may all be handled in a different manner.

14) If the user 121 persistently gets phone calls from vendor(s) that are not in a preferred vendor list then a new rule could be established to block or divert these calls.

In some embodiments, the server 110 is in communication with a social networking server, and hence may be enabled to determine communication handling rule changes which are weighted according to a personal relationships and/or peer networks. Determination of weighting may thus be incorporated into the pre-defined algorithms, with communication handling rules associated with close friends and/or relatives being weighted higher than communication handling rules associated with distant friends and/or relatives. Further, a black list and/or a white list may be updated according to information received from the social networking server.

From the above description of pre-defined algorithms, it is understood that the various analyzer modules 201-204, the information discovery module 205 and the rules formulation and confirmation module 206 work in conjunction to analyze schedule data, presence data, call data, business data, collaboration data and/or any other data available from the information feeds 140-154, the client applications 220 and/or 225, the switch application 229 and/or the IVR system application 260 to discern patterns in the behaviour of the user 121 which may suggest a new communication handling rule and/or a change to a communication handling rule.

The database 138 then provides storage of confirmed communication handling rules in the set of communication handling rules R1. The set of communication handling rules R1 can be accessed by suitably enabled internal or external applications. The database 138 may also store configurations and policies tuned to the needs and/or preferences of the user 121.

Figure 3:
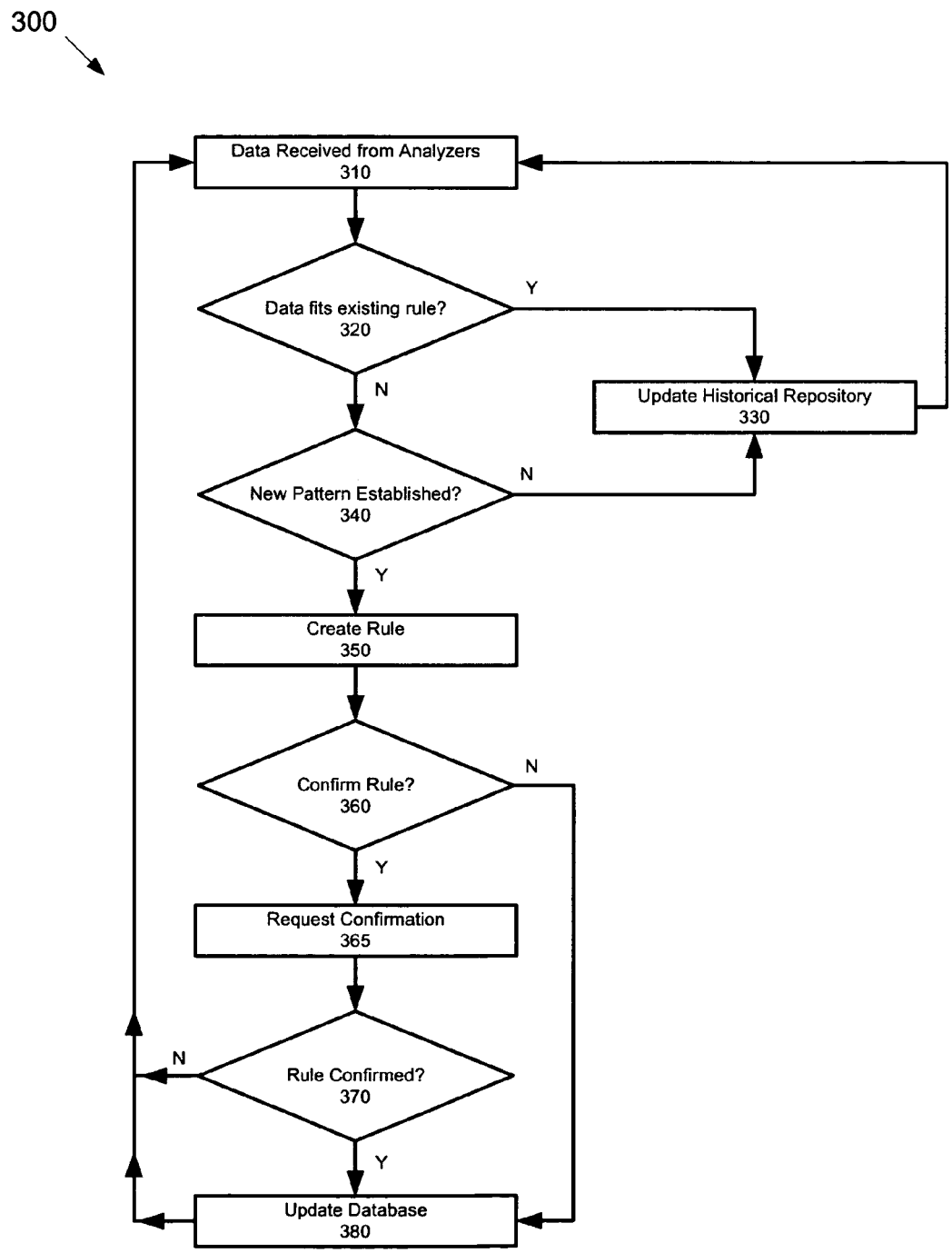
FIG. 3 depicts a flowchart of a method for determining communication handling rule changes, according to a non-limiting embodiment.

Attention is now directed to FIG. 3 which depicts a method 300 for determining communication handling rule changes. In order to assist in the explanation of the method 300, it will be assumed that the method 300 is performed using the system 100. Furthermore, the following discussion of the method 300 will lead to a further understanding of the system 100 and its various components. However, it is to be understood that the system 100 and/or the method 300 can be varied, and need not work exactly as discussed herein in conjunction with each other, and that such variations are within the scope of present embodiments.

At step 310, data is received at the information discovery module 205 from the various analyzer modules 201-204. At step 320, the information discovery module determines if the data fits into an existing communication handling rule. For example, data may be received from the various analyzer modules 201-204 which indicates that a call from a given caller to the user 121 has been routed to the IVR system 160 when presence data indicates that the user 121 is available. The information discovery module 205 may then access the set of communication handling rules R1 at the database 138 to determine if there is an existing communication handling rule which causes calls from the given caller to the user 121 to be routed to the IVR system 160 when presence data indicates that the user 121 is available. If such a communication handling rule already exists then, in some embodiments, the historical repository H1 is updated at step 330 to reflect that the call was routed to the IVR system 160 and that the presence of the user 121 was "available", and the information discovery module 205 continues to receive data from the various analyzer modules 201-204 at step 310. In other embodiments, the update to the historical repository H1 may be skipped and the information discovery module 205 continues to receive data from the various analyzer modules 201-204 at step 310.

However, if such a communication handling rule does not already exists, at step 340, the information discovery module 205 processes the data along with data from the historical repository H1 to determine if a new pattern has been established. In one non-limiting embodiments, a pattern may be determined to be an established pattern if the number of times that an event has occurred has reached a threshold number.

Continuing with the above example, the data received from the various analyzer modules 201-204, along with data from the historical repository H1, may indicate that this is the third time that a call from the given caller to the user 121 has been routed to the IVR system 160 when presence data indicates that the user 121 is available. If the threshold value for establishing a pattern is greater than three, then the information discovery module 205 determines at step 340 that a new pattern has not been established, and the data is stored at the historical repository H1 at step 330, and the information discovery module 205 continues to receive data at step 310. However, if the threshold value for establishing a pattern is three, then the information discovery module 205 determines at step 340 that a new pattern has been established and the subset of data (i.e. the data received from the various analyzer modules 201-204, along with data from the historical repository H1, that indicates that this is the third time that a call from the given caller to the user 121 has been routed to the IVR system 160 when presence data indicates that the user 121 is available) is passed to the rules formulation and confirmation module 206 at step 350 such that a new communication handling rule may be formulated.

Alternatively, at step 350, the rules formulation and confirmation module 206 may determine that a communication handling rule for handling communications represented by the subset of data already exists, and that the subset of data contradicts the existing communication handling rule. Hence, the rules formulation and confirmation module 206 determines that the subset of data is indicative of a change to the existing communication handling rule.

In any event, at step 350 a new communication handling rule and/or a change to an existing communication handling rule is formulated. In some embodiments, the data from the various analyzer modules 201-204 may be indicative of a change to a template for the communication handling rule (e.g. from the rules template server 152), while in other embodiments, a template for the communication handling rule may be retrieved from the database 138. In any event the new rule (and/or change to an existing communication handling rule) may be formulated based on a template.

At step 360, the rules formulation and confirmation module 206 determines if the new communication handling rule (and/or change) is to be confirmed with the user 121, for example by consulting the set of communication handling rules R1 at the database 138. If a similar communication handling rule exists that does not require confirmation, then in some embodiments, the rules formulation and discovery module 206 may determine that the new communication handling rule (and/or change) need not be confirmed with the user 121. In some embodiments, the user 121 may set preferences at the database 138 via the client application 229 to indicate which types of communication handling rules require confirmation and which do not.

If the new communication handling rule (and/or change) is not to be confirmed, then the set of communication handling rules R1 at the database 280 is updated at step 380 (i.e. the new communication handling rule (and/or change) is stored at the database 280), and the information discovery module 205 continues to receive data from the various analyzer modules 201-204 at step 310. However, if the new communication handling rule (and/or change) is to be confirmed, confirmation is requested at step 365 from the user 121 and/or the user 126, using for example, a method 400 described below with reference to FIG. 4.

If at step 370, the rules formulation and discovery module 206 determines that the new communication handling rule (and/or change) is confirmed then the set of communication handling rules R1 at the database 280 is updated at step 380 (i.e. the new communication handling rule (and/or change) is stored at the database 280). The information discovery module 205 then continues to receive data from the various analyzer modules 201-204 at step 310

The method 300 hence enables communication handling rules to age by proposing changes to existing communication handling rules within the set of communication handling rules R1.

Further, as the server 110 has access to the organizational structure of a business or organization (i.e. via the organizational database 148) as well as the projects the user 121 is associated with, the set of communication rules R1 is enabled to evolve with the changes in the business or organization as well the role of the user 121 within the business or organization.

In some embodiments, the new communication handling rule (and/or change) may be transmitted to the element of system 100 responsible for applying the communication handling rule. For example, if the new communication handling rule (and/or change) pertains to how calls are handled at the switch 129, then the new communication handling rule (and/or change) may be transmitted to the switch 129 for implementation by the switch application 229. Alternatively, a communication is received by an element of the system 100, the element may communicate with the server 110 to determine if there is a rule stored at the database 138 (i.e. in the set of communication handling rules R1), which govern how the communication is to be handled.

Figure 4:
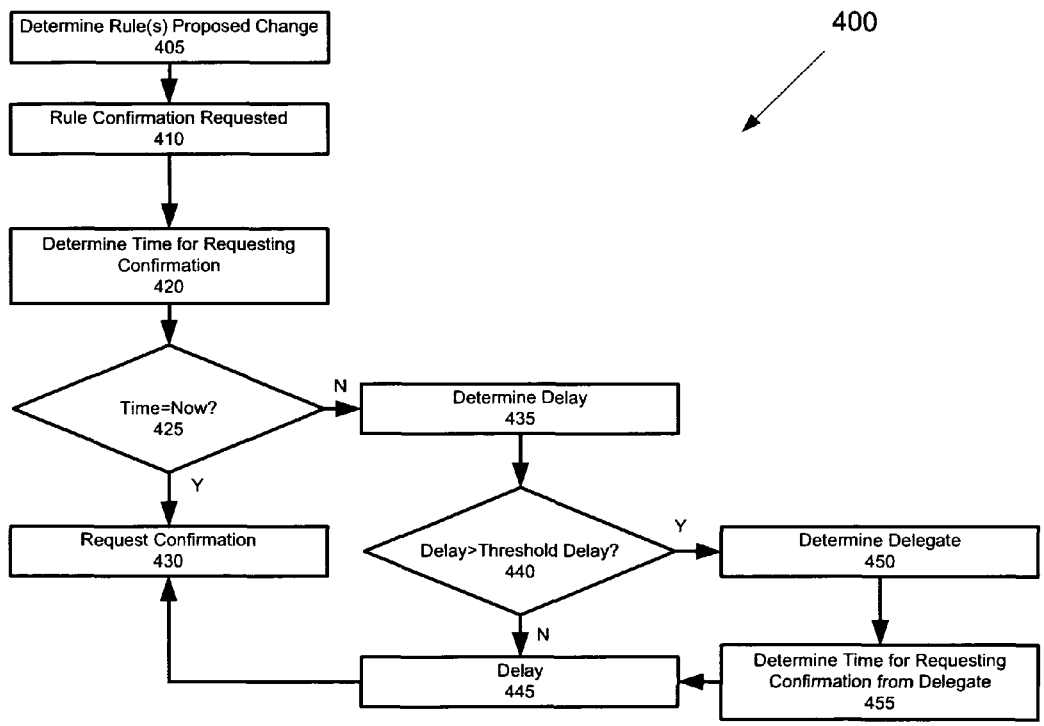
FIG. 4 depicts a flowchart of a method for requesting confirmation of a communication handling rule change, according to a non-limiting embodiment.

Attention is now directed to FIG. 4 which depicts a method 400 of requesting confirmation of a communication handling rule change. In order to assist in the explanation of the method 400, it will be assumed that the method 400 is performed using the system 100. Furthermore, the following discussion of the method 400 will lead to a further understanding of the system 100 and its various components. However, it is to be understood that the system 100 and/or the method 400 can be varied, and need not work exactly as discussed herein in conjunction with each other, and that such variations are within the scope of present embodiments.

At step 405 a proposed change to a set of communication handling rules is determined, which in some embodiments may be similar to steps 310-350 of method 300, and hence step 405 may occur via the various analyzer modules 201-204, the information discovery module 205 and/or the rules formulation and confirmation module 206. However, other methods of determining a proposed change to a set of communication handling rules are within the scope of present embodiments. For example, call handling presence server taught in US Patent Application Number 2007/0165554 may also be used to determine a proposed change to a set of communication handling rules. Other methods of determining a proposed change to a set of communication handling rules will occur one of skill in the art.

At step 410 it is determined that confirmation has been requested for a proposed change to a set of communication handling rules (e.g. the set of communication handling rules R1) for example the addition of a new communication handling rule to the set and/or a change to a communication handling rule within the set. In some embodiments, the confirmation requested is similar to the confirmation requested at step 365 of method 300 described above. In these embodiments, step 410 (and the following steps 420-455) may be implemented by the rules formulation and confirmation module 206.

At step 420, a time within a schedule is determined for requesting confirmation of the proposed change. In some embodiments, the user 121 may have stored a preference within the set of communication handling rules R1 indicative of a preferred time for responding to confirmation request. In other embodiments, a schedule associated with the user 121 and/or behaviour patterns associated with the user 121 are processed to determine a time within a schedule for requesting confirmation of the proposed change. For example, the rules formulation and confirmation module 206 may request schedule data from the collaboration system 146 to determine when the user 121 may be available to respond to a confirmation request.

Further, the rules formulation and confirmation module 206 may process behaviour patterns of the user 121 stored at the historical repository H1 and/or behaviour patterns associated with existing communication handling rules stored in the set of communication handling rules R1. Hence, in some embodiments, the set of communication handling rules R1 may comprise "meta-rules" for confirmation of policy rules. For example, based on the behaviour of how and when the user 121 directly approves proposed changes (as opposed to deferring approval to a later time or passing approval to a delegate), appropriate circumstances could be determined for requesting confirmation of the proposed change. For instance if the user 121 has a history of approving proposed changes prior to the first meeting of the day, requests for confirmation of a proposed change may be presented prior to the first meeting of each day. Such a history may be determined by processing the historical repository H1 and/or behaviour patterns associated with existing communication handling rules stored in the set of communication handling rules R1, to determine if the percentage of times that the user 121 approves rules prior to the first meeting of the day is greater than a threshold percentage (and/or a strong majority).

In general the schedule and/or behaviour pattern data processed successively (in any desired order) or concurrently to determine an optimal time to request confirmation from the user 121.

In general, a time within a schedule is determined for requesting confirmation of the proposed change comprises a time within the schedule that may be convenient for the user 121 to respond to confirmation requests. Non-limiting examples of times within the schedule that may be convenient for the user 121 to respond to confirmation requests include but are not limited to:

lunchtime;
early in a day;
late in a day;
when a mood analyzer is indicative that the user 121 is in a relaxed mood (e.g. determined via analysis of keyboard typing and/or a voice stress analyzer, not depicted);
when the user 121 is determined to be travelling and presence indicates that the user 121 is available on the mobile communications device 123;
days when the amount of times spent in meetings is proportionally small;
times designated by the user 121 for responding to administrative issues;
times prior to the user 121 being presently unavailable for long periods (such as for an upcoming trip and/or vacation); and/or
times that the user 121 has a history of approving proposed changes, as described above.

Other time within the schedule that may be convenient for the user 121 to respond to confirmation requests are within the scope of present embodiments.

In some embodiments, as determined at step 425, the user 121 may be presently available to respond to confirmation requests and confirmation is hence requested at step 430. For example, the rules formulation and confirmation module 206 may cause a confirmation request to be transmitted to the client device 120. In these embodiments, the client application 220 may responsively cause a pop-up to appear at the client device (e.g. on a display device associated with the client device 120), which relays the new communication handling rule and/or change and requests confirmation thereof, for example via accept/reject buttons within the pop-up. Alternatively, the pop-up may comprise a button which enables the user 121 to indicate that they wish to respond, but at a later time. Should the user 121 choose this button, in some embodiments, the user 121 may also indicate desired delay and/or a desired time at which the user 121 wishes to be contacted for a response. In these examples, a record of these events may be stored in the historical repository H1 (and used to determine a time for requesting confirmation for future proposed changes) and step 420 may be reapplied to determine the time at which confirmation is to be requested by processing the indication from the user 121.

Alternatively, the rules formulation and confirmation module 206 may cause a confirmation request to be transmitted to the client application 220, communication device 122 and/or the mobile communication device 123 in any suitable format including an e-mail, a voicemail and/or a combination. If a voicemail, the user 121 may respond to the confirmation request via a voice interaction, for example via the IVR system 160.

In some embodiments, the confirmation request may further comprise an indication of productivity gains that may result by accepting the confirmation request. For example, if the proposed change is associated with a communications handling rule who's acceptance would save the user 121 time (e.g. by automatically implementing call forwarding, or by automatically choosing an appropriate voice mail message), the system 100 may be further enabled to estimate the time saved if the confirmation request were accepted and hence the productivity gain. This indication may be offered to the user 121 as a further incentive for responding to the confirmation request.

If however at step 425 it is determined that the user 121 is not presently available to respond to confirmation requests, then at step 435 a delay is determined which is indicative of the length of time that the system 100 must wait before requesting confirmation from the user 121. In some embodiments, the delay may be determined concurrent with steps 415 and 420.

At step 440, it is determined if the delay exceeds a threshold delay. In some embodiments, the threshold delay may be set by an administrator of the system 100, while in other embodiments, the threshold delay may be set by the user 121 (and/or the user 126). If the delay is less then the threshold delay, then the system 100 delays at step 445 before requesting confirmation of the proposed change, at the time determined at step 420.

Hence, the user 121 is presented with confirmation requests only at times that are convenient to the user 121, generally preventing screen pop-up syndrome and preventing the confirmation requests from becoming an annoyance to the user 121.

If however the delay is greater than the threshold delay, at step 450, a delegate is determined for requesting confirmation of the proposed change. In some embodiments, the user 121 may have designated a delegate via an interaction with the client application 220, a delegate identifier being subsequently stored at the database 138. In other embodiments, the information feeds 140-154 may be queried to determine a delegate. For example, a delegate may be determined by querying the organization database 148 to determine a suitable colleague and/or a subordinate to the user 121, such as an administrative assistant. Alternatively, the collaboration system 146 may be queried to determine a suitable contact associated with a project on which the user 121 is presently collaborating.

In yet further embodiments, the system 100 may be enabled to determine a suitable communication handling rule for determining a suitable delegate. For example, a first delegate may be available during some time periods but not other time periods, while a second suitable delegate may be available during those time periods when the first delegate is not available. Furthermore, the suitable delegate may also be associated with the proposed change. For example, if the proposed change is associated with communications related to a particular project, a suitable delegate may be a delegate associated with the particular project. Similarly another proposed change may be associated with general communications, and a suitable delegate may be an administrative assistant. In an exemplary embodiment, the user 126 is determined to be a suitable delegate. In another exemplary embodiment, the delegate device 125 is determined to be a suitable delegate.

In an alternative embodiment, it may be determined if the number of outstanding confirmation requests exceeds a threshold number of outstanding confirmation requests. If not, then the system, the system 100 delays at step 445 before requesting confirmation of the proposed change, at the time determined at step 420. If so, a delegate is determined at step 450.

In any event, once the delegate is determined at step 450, at step 455, a time within a delegate schedule is determined for requesting confirmation of the proposed change, similar to the step 420. If the delegate is not presently available, the system 100 again delays at step 445 before requesting confirmation at step 430 from the delegate at step 430 (e.g. by contacting the delegate via the delegate device 125 (e.g. via the client application 225) and/or the communication device 127, as described above with respect to the user 121).

In some embodiments, the method 400 may also determine if a delay until the delegate is available exceeds a threshold delay (for example if the user 126 is on vacation at the same time as the user 121), and may further determine another delegate. This process may continue indefinitely until a suitable delegate who is able to respond to confirmation requests in a timely fashion is determined.

Hence, if the user 121 is generally unavailable for a threshold period of time, or the number of confirmation requests has exceeded a threshold number, then the system 100 conveniently determines a delegate who can respond to the confirmation requests, and the proposed change (or changes) to a set of communication handling rules is implemented in a timely fashion.

Those skilled in the art will appreciate that in some embodiments, the functionality of the application 135, the client application 220, the client application 225, the switch application 229 and the IVR system application 260 may be implemented using pre-programmed hardware or firmware elements (e.g., application specific integrated circuits (ASICs), electrically erasable programmable read-only memories (EEPROMs), etc.), or other related components. In other embodiments, the functionality of the application 135, the client application 220, the client application 225, the switch application 229 and the IVR system application 260 may be achieved using a computing apparatus that has access to a code memory (not shown) which stores computer-readable program code for operation of the computing apparatus. The computer-readable program code could be stored on a medium which is fixed, tangible and readable directly by these components, (e.g., removable diskette, CD-ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. In a server/client environment, a method of requesting confirmation of a communication handling rule change, comprising,
   at a server comprising a processor, the processor enabled
   for determining a proposed change to a set of communication handling rules;
   for determining a time within a schedule for requesting confirmation of said proposed change by:
   using schedule data received from another system to determine when a user may be available to respond to a confirmation request, and/or
   processing behavior pattern data of the user that is:
   stored at a historical repository, and/or associated with existing communication rules that are stored in the set of communication handling rules; and
   for requesting said confirmation of said proposed change, at said time.

2. The method of claim 1, further comprising determining at least one of a location and a communication device for requesting said confirmation, and said requesting said confirmation of said proposed change, at said time, further comprises requesting said confirmation at, at least one of said location and said communication device.

3. The method of claim 1, further comprising:
   determining that there is no suitable time within a schedule for requesting confirmation of said proposed change; and, in response:
   determining a delegate for requesting said confirmation of said proposed change;
   determining a time within a delegate schedule for requesting confirmation of said proposed change; and
   requesting said confirmation of said proposed change from said delegate, at said time within said delegate schedule.

4. The method of claim 3, wherein said determining that there is no suitable time within a schedule for requesting confirmation of said proposed change comprises:
   determining a delay for requesting said confirmation based on a current time and said time within a schedule; and
   determining that said delay is greater than a threshold delay.

5. The method of claim 3, wherein said determining a time within a delegate schedule for requesting confirmation of said proposed change comprises processing at least one of said delegate schedule and a record of at least one previously determined time for requesting confirmation, from said delegate, of a previous proposed change to said set of communication handling rules.

6. The method of claim 1, wherein determining the time within a schedule for requesting confirmation of said proposed change by processing the schedule data and/or behavior pattern data successively or concurrently to determine a time to request confirmation from the user.

7. The method of claim 1, wherein determining a communication device for requesting said confirmation, and the system requesting said confirmation of said proposed change at said time and at said communication device.

8. The method of claim 1, wherein communications handling rules comprise one or more of rules for: routing calls, accepting a call, enabling/disabling mobile twining, marking a call as urgent, applying call screening, changing the presence of the user, generating a greeting to be played to a caller, call forwarding, notification of email, and diverting calls.

9. A system for requesting confirmation of a communication handling rule change, comprising,
    a computing device comprising
        a communication interface for communication over a communication network; and
        a processor enabled for
    determining a proposed change to a set of communication handling rules;
    determining a time within a schedule for requesting confirmation of said proposed change by:
    using schedule data received from another system to determine when a user may be available to respond to a confirmation request, and/or
    processing behaviour pattern data of the user that is: stored at a historical repository, and/or associated with existing communication rules that are stored in the set of communication handling rules; and
    requesting said confirmation of said proposed change, at said time;
    a database for storing said set of communication handling rules, said computing device having access to said database;
    at least one information feed in communication with said computing device, for providing information to said computing device to assist in said determining a proposed change to a set of communication handling rules and said determining a time within a schedule for requesting confirmation of said proposed change.

10. The system of claim 9, said processor further enabled for
    determining that there is no suitable time within a schedule for requesting confirmation of said proposed change; and, in response:
    determining a delegate for requesting said confirmation of said proposed change;
    determining a time within a delegate schedule for requesting confirmation of said proposed change; and
    requesting said confirmation of said proposed change from said delegate, at said time within said delegate schedule; and
the system further comprising
    at least one delegate device associated with said delegate, in communication with said computing device, for receiving a delegate confirmation request generated in association with said requesting said confirmation of said proposed change from said delegate, at said time within said delegate schedule, and responding to said delegate confirmation request.

11. The system of claim 9, said computing device further comprising,
    at least one analyzer module for analyzing information from said at least one information feed, said at least one analyzer module comprising at least one of:
    a call log message analyzer enabled for analysis of telephony activities of a user associated with at least one of said client device and a delegate device;
    a messaging analyzer enabled to analyze messaging activities of said user, said messaging activities associated with at least one of voice mail, faxes, emails, and chat sessions;
    a collaboration analyzer enabled to analyze collaboration activities of said user, said collaboration activities associated with at least one of tasks, conferencing, and contacts;
    a presence analyzer enabled to analyze presence data associated with said user said presence data associated with at least one of current calendar activities, future calendar activities, keyboard activity, user proximity detection, and presence engine information; and
    an information discovery module enabled to receive data from said at least one analyzer module and to determine a pattern based on said data; and
    a rules formulation and confirmation module enabled to: receive patterns from said information discovery module; to use predefined algorithms to determine a best fit for a particular pattern to arrive at said proposed change to a set of communication handling rules; and store said proposed change in said database.

12. The system of claim 11, said computing device having access to a historical repository of data previously received from said at least one analyzer module, and said information discovery module further enabled to add said data to said historical repository if said data is insufficient to establish a pattern.

13. The system of claim 12, wherein said information discovery module is further enabled to determine said pattern based on said data stored in said historical repository.

14. The system of claim 11, wherein determining a time within a schedule for requesting confirmation of said proposed change is based on said pattern.

15. The system of claim 11, further comprising: at least one communication device enabled to engage in communication sessions; and a switch enabled to control communication sessions with said at least one communication device, said switch further enabled to receive said communication handling rules and from said computing device and further enabled to apply said communication handling rules to said communication sessions.

* * * * *